C. W. WALLER.
FLYING MACHINE.
APPLICATION FILED APR. 23, 1913.

1,083,714.

Patented Jan. 6, 1914.
6 SHEETS—SHEET 3.

Witnesses

Inventor
Charles W. Waller
By Victor J. Evans
Attorney

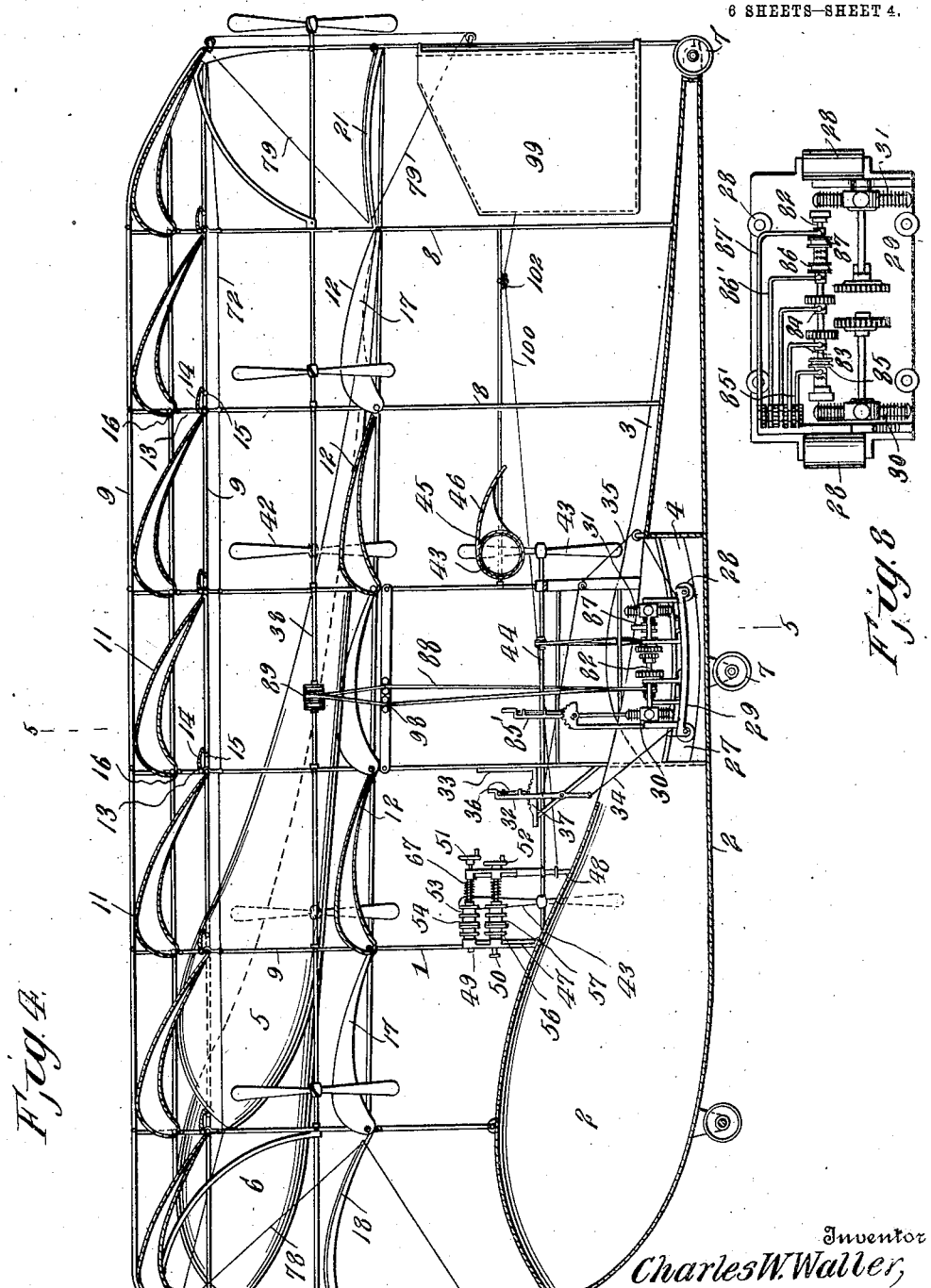

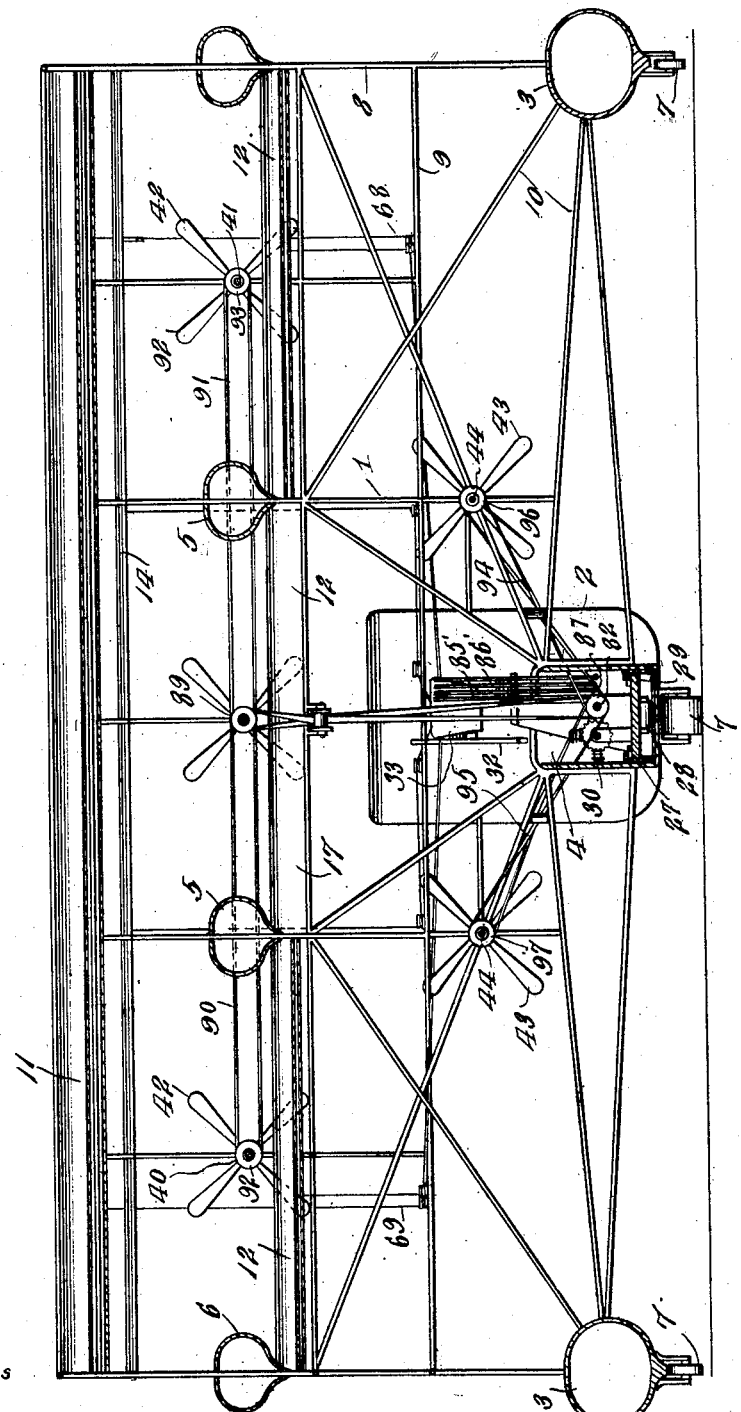

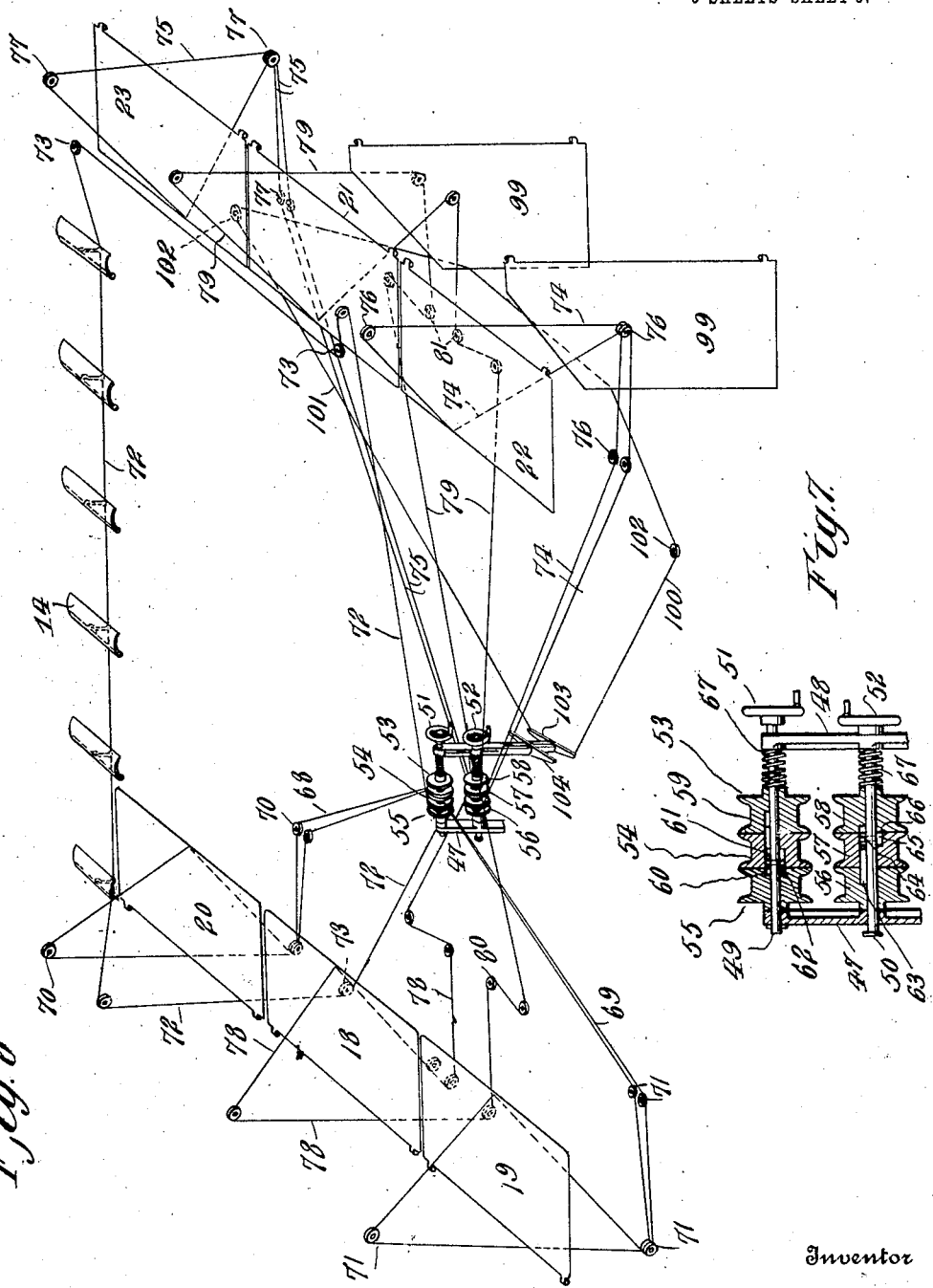

UNITED STATES PATENT OFFICE.

CHARLES W. WALLER, OF CHICAGO, ILLINOIS, ASSIGNOR OF ONE-HALF TO PETER A. FRANZMANN, OF CHICAGO, ILLINOIS.

FLYING-MACHINE.

1,083,714.  Specification of Letters Patent.  Patented Jan. 6, 1914.

Application filed April 23, 1913. Serial No. 763,090.

*To all whom it may concern:*

Be it known that I, CHARLES W. WALLER, a citizen of the United States, residing at Chicago, in the county of Cook and State of Illinois, have invented new and useful Improvements in Flying-Machines, of which the following is a specification.

My invention relates to flying machines of the aeroplane type, and particularly to flying machines having plural carrying surfaces in the form of following planes.

One object of the invention is to provide a machine of this character, possessing inherent longitudinal and lateral stability, and so constructed that it will act as a parachute in case of accident in the air, thereby avoiding the casualties attributable to the machine losing its balance, etc., and which, furthermore, will interpose sufficient air resistance to secure a rapid parachutic action and reduce the falling speed while maintaining the machine upright, thereby insuring a safe and easy descent.

A further object of invention is to provide a construction which the weight of the power plant, pilot, passengers, etc., will be so arranged relative to the carrying surface as to act as a gravity balancing means tending constantly to keep the machine in a state of poise and thus maintain both longitudinal and lateral stability.

A still further object of the invention is to devise a machine which will more efficiently utilize and take advantage of natural laws governing and controlling the flotation and supporting capacities of aerial craft, and in which the structural elements are throughout given as far as possible a streamline form and constructed to give maximum air displacement and support in proportion to their weight, whereby a greater load sustaining area and a higher degree of flying are secured.

A still further object of the invention is to provide a machine having as many of its parts as possible made hollow, with the cavities thereof either forming vacuum chambers or filled with some gas lighter than air, such as hydrogen gas, thereby obtaining both strength and lightness combined.

Figure 1:
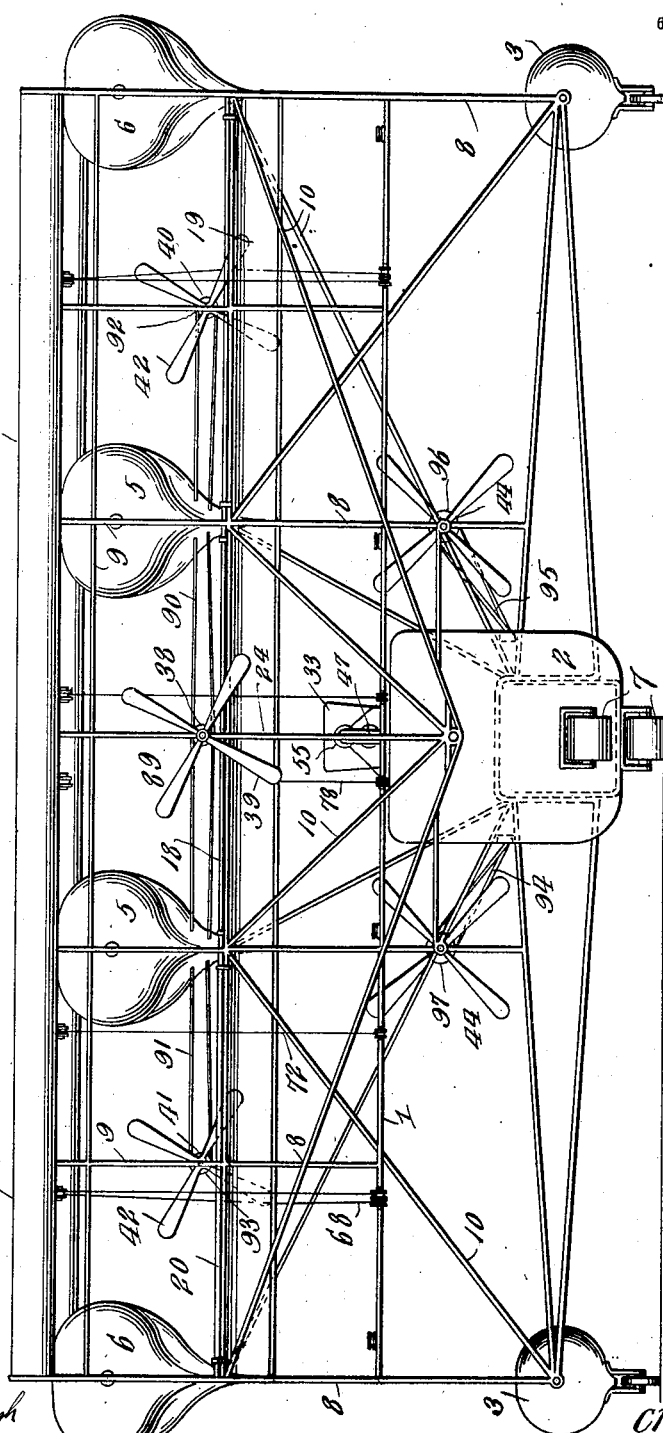
Figure 2:
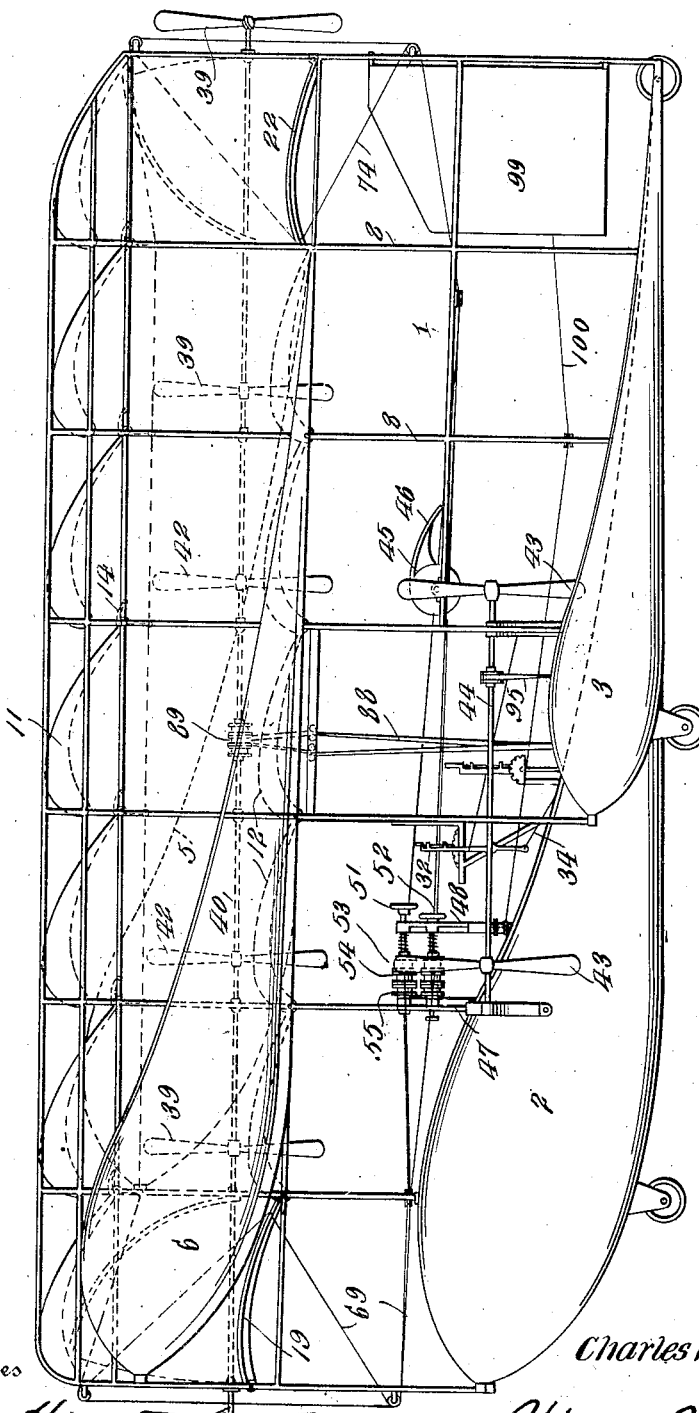
Figure 3:
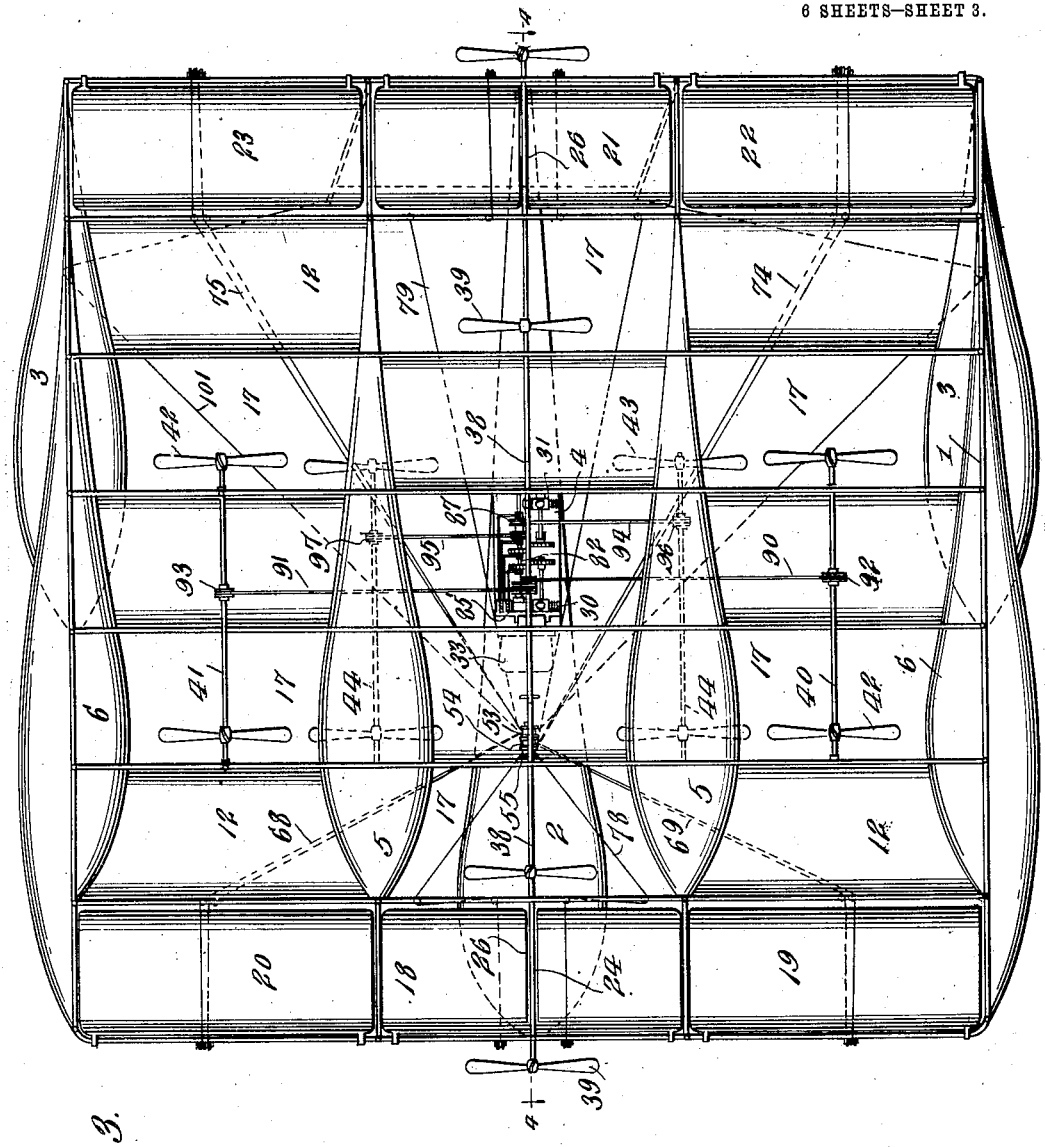

With these and other objects in view, which will appear as the nature of the invention is more fully disclosed, the invention consists of the features of construction, combination and arrangement of parts, hereinafter fully described and claimed, erence being had to the accompanying drawings, in which:

Figure 1 is a front elevation of a flying machine constructed in accordance with my invention. Fig. 2 is a side elevation of the same. Fig. 3 is a top plan view, the upper planes being omitted. Fig. 4 is a vertical longitudinal section on line 4—4 of Fig. 3. Fig. 5 is a vertical transverse section on the line 5—5 of Fig. 4. Fig. 6 is a diagrammatic view in perspective of the steering and controlling means, the shutters at one side of the machine being omitted. Fig. 7 is a vertical longitudinal section through the primary controlling device. Fig. 8 is a detail view showing a feature of construction.

Referring to the drawings, 1 designates a suitable framework, the parts of which may be hollow and of streamline form and, if desired, exhausted of air or filled with gas lighter than air. Arranged at the base of this frame is a main hollow flotation body 2, which is disposed in the center line of the frame. This body serves as a car or carrier for the power plant, aviator, steering and controlling devices and passengers, if any, and also as a main pontoon for supporting the machine in a body of water. Also carried by the frame are relatively smaller side hollow bodies 3, which are arranged mainly in rear of the transverse center of the machine and coact with the central body 2 to form a flotation base giving aerial support and adapting the machine to float and travel in a balanced position upon the surface of a body of water. Each of these hollow bodies is of fusiform or streamline shape and is preferably of maximum depth and slightly upturned at its forward end to a suitable angle of incidence, thus increasing its supporting and buoying capacity in air and water. The central body 2 is provided with an engine compartment 4, but in practice the remainder of this body and the interior of each of the bodies 3 is preferably either exhausted of air or filled with hydrogen gas or other gas lighter than air, in order to decrease the weight thereof. The frame also carries a pair of upper flotation bodies 5 arranged on opposite sides of its longitudinal center, and a pair of lateral or side hollow bodies 6, which bodies 5 and 6 conform generally in construction to the bodies 2 and 3. The bodies 5 extend from a point about midway of the distance between the forward portion and the transverse center of the machine to a point in advance of the rear end of the machine, while the bodies 6 extend approximately the entire length of the machine, the said bodies 5 and 6 serving the function of aerostats adapted through their arrangement and the relatively overlapping disposition of the bodies 3 and 6 to give both lateral and longitudinal stability to the machine and to prevent skidding thereof. These bodies may be constructed of rubber, balloon silk or other elastic material, may be partially rigid and partially elastic, or constructed in hollow form of metal, or made solid, as desired. When the bodies are of solid structure it will, of course, be understood that they will operate simply as fusiform aerofoil surfaces. The hollow bodies 2 and 3 are provided with suitable launching and landing wheels 7.

The frame of the machine may be of any suitable construction and in the form disclosed includes vertical frame rods or tubes 8, horizontal longitudinal and transverse frame rods or tubes 9 and suitable braces 10 wherever necessary between the parts, in addition to which bracing wires or cables may also be employed at points desired. The frame carries an upper series of following or tandem planes 11 and a lower series of following or tandem planes 12, which planes may be in the form of hollow streamline bodies properly curved to secure a dynamical reaction of the air thereon for a maximum supporting effect with a minimum degree of head resistance. The planes 11 are in a continuous fore and aft series and extend transversely across the frame and are so arranged that the lead edge of each following plane terminates above and approximately in line with the trail edge of the preceding plane, leaving an intervening gap 13 forming a flue or chimney whereby the air impelled downward by one plane is drawn upward into the path of the succeeding plane for reaction thereon. Pivoted shutters 14 are provided to control the gaps 13 and stops 15 and 16 are suitably arranged to limit the downward and upward movements of said shutters, which are controlled and operated through mechanism hereinafter fully described. It will be observed that these planes are so arranged as to provide a supporting surface which may be of any reasonable fore and aft and transverse dimensions so that machines of large size and load weight carrying capacity may be built and operated efficiently. By means of the shutters the gaps 13 may be controlled to regulate the action of the air on the planes, or the gaps closed to any desired extent to confine the air when the supported surface as a whole is employed as a parachute.

The planes 12 are of the divided type and are arranged in sets or series of alined planes on opposite sides of the longitudinal center of the machine and a central set of planes between the side sets, the planes of each series being separated by and alternating with air gaps or passages 17 coinciding substantially in width therewith, the central planes and gaps being arranged in respective alinement with the gaps between the side planes and with said side planes. In the general plane of the planes 12 I also provide at the front of the machine a central door 18 and side doors or planes 19 and 20 and at the rear of the machine a central door 21 and side doors or planes 22 and 23, the doors 18 and 21 having slots or openings 24 formed therein, for a purpose hereinafter described. The doors 18, 19 and 20, 21, 22 and 23 are pivoted to swing in a vertical plane and are curved to conform to the supporting planes. The doors 18 and 21 normally rest upon and are limited in downward motion by the front and rear central planes of the series 12 and are adapted to swing upwardly to a vertical position against suitable stops and braces 25 on the frame, while the lateral doors or planes 19, 20, 22 and 23 are movable upwardly and downwardly from a normally horizontal position, whereby they are adapted to act as elevators or horizontal rudders, lateral stability devices and longitudinal trimming or balancing devices. The doors 18 and 21 when swung upwardly to a vertical position close the spaces between the superposed sets of planes at the front and rear, thus adapting the upper series of planes to serve the function of a parachute, through the gaps of which the confined body of air may be allowed to escape as slowly or as rapidly as desired through the controlling action of the doors 14, by which in the event of accident to the power plant the rate of fall of the machine may be controlled and an easy and safe landing insured. Strips of suitable material 26 are provided upon the frame to close the slots 24 in the doors 18 and 21 when the latter are swung upward, to confine the air against escape except by and through the controlled gaps 13.

Within the compartment 4 are arranged guideways 27 to receive wheels or rollers 28 upon a motor supporting bed or truck 29 which supports in the present instance a pair of motors 30 and 31. The bed or truck is movable or adjustable on an inclined plane in the guideways 27 in a fore and aft direction so that the weight of the power plant may be arranged to compensate for variations between the centers of gravity and pressure under different conditions of service to maintain such centers in coincidence and to longitudinally balance or trim the craft. In order to enable the motor truck to be so adjusted, an operating lever 32 is arranged in proximity to the aviator's seat 33 and has attached thereto, above and below its pivotal point, cables 34 and 35 which are suitably guided and attached to the front and rear portions of the truck in such manner that by swinging the lever in one direction or the other the truck and its load weight may be shifted forwardly or rearwardly. The lever carries a dog or locking device 36 adapted to engage a rack 37 whereby it may be locked to hold the truck fixed in any of its positions of adjustment. It will be observed that the hollow fusiform bodies 2, 3, 5 and 6 have their centers of gravity and pressure arranged at different points in the length of the machine frame, whereby additional longitudinal stability is secured, and that these bodies, in addition to their flotation action, tend to inhibit side drift and any inclination of the craft to turn unduly under excess air pressures in either direction laterally upon its longitudinal axis, by which a machine having a high degree of inherent longitudinal and lateral stability is produced. By disposing the weight of the motors at a relatively low point and providing for a shifting of such weight in a longitudinal direction, any variation between the established centers of gravity and pressure which may occur at different times through changes in the arrangement of the fixed parts or the carriage of freight and other loads may be compensated for in a simple, reliable and effective manner.

For propulsion I provide a central longitudinal drive shaft 38 carrying a series of propellers 39, the intermediate ones of which are arranged to operate in certain of the gaps or passages 17, and side longitudinal shafts 40 and 41 carrying propellers 42 operating in the gap 17 between the side series of planes of the surface 12. These sets of propellers are designed to drive the machine ahead at a desired speed and the central set and side sets are adapted to be operated independently or conjointly for a regulation of speed as occasion requires. As these propellers are arranged above the horizontal central line of the frame, and as their working tendency is to cause the machine to tilt downwardly and forwardly on its transverse axis, this tendency is overcome by proper arrangement of the weight of the motors and increased area and angle of incidence of the forward portion of each hollow body, whereby all of the flotation and load weight factors tend to maintain the machine in equilibrium, while providing for the arrangement of the propelling devices at such a point and in such number and arrangement as to secure maximum propulsive efficiency. I also preferably provide auxiliary propellers 43 arranged on longitudinal shafts 44 disposed on opposite sides of the main hollow body 2, with the front and rear lower propellers 43 operating mainly above the mean center horizontal line of said horizontal body and slightly in front and in rear of the centers of gravity and pressure. These propellers 43 also tend to resist the tilting thrust action of the propellers 39 and to give increased propulsion power and operate in action to apply power or thrust pressure substantially in the line of the hollow body 2 to counteract the drift or head resistance of such body to travel through the air or water. A fuel supply tank 45 is supported in proximity to the motors for the supply of fuel thereto through suitable conductors, and this tank is preferably inclosed in a stream line casing 46. It will, of course, be understood that the various elements of the framework structure may also be of suitable form to diminish head resistance.

For the purpose of operating and controlling the shutters 14, front and rear center doors 18 and 21 and front and rear pairs of lateral doors or planes 19 and 20 and 22 and 23, I provide suitable controlling mechanism comprising spaced posts 47 and 48 in which are journaled and slidably mounted shafts 49 and 50 provided with hand wheels or other operating devices 51 and 52. On the shaft 49 is a series of drums or pulleys 53, 54 and 55, while on the shaft 50 is a similar series of drums or pulleys 56, 57 and 58, the drums of the two series being respectively arranged in reverse order. The central and rear drums 53 and 54 are connected with the shaft 49 by a key or feather 59 for movement in unison, while the drum 55 is loose on said shaft. The shaft 49 is provided with a key or projection 60 normally occupying a recess 61 in the drum 54 and adapted by a forward longitudinal movement of the shaft to be projected into a key seat or recess 62 in the drum 55 to fix the latter to the shaft. The center and forward drums of the lower series are fixed to the shaft 50 to turn in unison therewith by a key or feather 63 and on said shaft 50 is a key or projection 64 normally occupying a recess 65 in the central drum 57 and adapted to be projected into a key seat or recess 66 in the loose drum 58 to fix said drum to said shaft upon a rearward longitudinal movement of the latter. Coiled springs 67 surround the shafts between the drums and the post 48 to maintain the parts in normal relationship. The drums 53 and 54 are connected by reversely winding sets of cables 68 and 69 passing over suitable guide pulleys 70 and 71 with the free edges of the doors or planes 19 and 20 whereby said planes in practice may be arranged for simultaneous adjustment in the same or opposite directions, to adapt said planes to operate as elevators or horizontal rudders or as lateral balancing devices, as may be desired. Cables 72 passing around suitable guides 73 connect cranks on the axes of the shutters 14 with the pulley 55, whereby when the latter is coupled to the shaft 49 the shutters may be opened and closed to the desired degree. The drums 56 and 57 are connected by reversely winding sets of cables 74 and 75 passing over suitable guide pulleys 76 and 77 with the free edges of the doors or planes 22 and 23, whereby the latter may be adjusted similarly to the doors or planes 19 and 20. The center doors 18 and 21 have their free edges connected by reversely winding sets of cables 78 and 79 passing over guide pulleys 80 and 81 with the drum or pulley 58, whereby when said drum or pulley is fixed to the shaft 50 the said center doors may be swung upwardly for the purpose described. The slots 24 in the front and rear center doors provide clearance spaces whereby said doors may be moved without interference from the shaft 38. It will thus be understood that through the described arrangement and mode of adjustment of the shutters and doors the supporting surface may be instantly converted in the event of danger into a parachute to insure a safe descent of the apparatus; and it will also be understood that the front and rear lateral doors or planes may be adjusted to operate as elevators or horizontal rudders or as ailerons or balancing planes at will, so that the machine may be sensitively controlled.

The mechanism for driving the various propeller shafts from the primary power devices or motors comprises a drive shaft 82 disposed between the shafts of the motors 30 and 31, suitable clutch devices 83 and 84 being provided for connecting said drive shaft with either one or both motor shafts at will. The shaft 82 is journaled for revoluble movement in suitable bearings on the motor truck or bed and carries driving pulleys or sprocket wheels 85, 86 and 87 adapted to be thrown into and out of connection with the shaft by suitable clutch devices 85', 86' and 87'. Through this arrangement either motor, when dead, may be started from the other motor, and the shaft 82 driven from either one or both motors, while any one, any two or all three of the drive pulleys may be thrown into and out of action at will. The construction described further adapts either motor when serviceable to be employed in case of derangement of the other motor to maintain the apparatus when in flight through any preferred selective action of the propelling devices. From the pulley 85 passes a belt or sprocket chain 88 which connects the same with a pulley 89 on the shaft 38, whereby said shaft and the main propellers 39 may be driven. Belts or sprocket chains 90 and 91 connect the pulley 89, which is a double pulley, with pulleys or sprocket wheels 92 and 93 on the shafts 40 and 41, whereby said shafts are driven. Belts or sprocket wheels 94 and 95 connect the pulley 87, which is also a double pulley, with pulleys or sprocket wheels 96 and 97 on the shafts 44, whereby said shafts are driven. All of the belts or sprocket chains above mentioned run in contact with intermediate drive pulleys or idlers 98, which permit said belts or sprocket chains to shift with the power plant when the latter is moved backward or forward without displacement from the driving and driven pulleys, which are grooved or otherwise constructed to maintain the belts or chains in engagement therewith.

In practice any suitable type of means for steering the machine laterally may be employed. In the present instance I have shown the use of a pair of rear vertical rudders 99 mounted to swing on vertical axes and connected for movement in unison by cords or cables 100 and 101 passing over guide pulleys 102, with the oppositely extending arms of a centrally fulcrumed lever 103 actuated by a hand or foot lever 104, whereby the rudders may be adjusted.

From the foregoing description, taken in connection with the accompanying drawings, the construction and mode of operation of my improved flying machine will be readily understood, and its advantages appreciated.

It will be apparent that the invention provides a machine which will operate strictly as an aerial vessel or as an aerohydroplane as occasion may demand, and which provides a supporting surface of adequate area to carry a comparatively heavy load weight.

It will be further apparent that the invention provide a machine which possesses inherent longitudinal and lateral stability to a high degree, which reduces head resistance, and which may be controlled with ease and facility and operated with a maximum degree of safety.

I claim:—

1. A flying machine embodying a frame structure, central and lateral fusiform bodies below the horizontal center of the frame structure, fusiform bodies on each side of the longitudinal center of the frame structure and above the horizontal center thereof, supporting surfaces above and below the latter named fusiform bodies and each consisting of a series of following planes, the planes of the upper surface having air gaps between their proximate edges, means for controlling said gaps, and suitable propelling and steering means.

2. A flying machine embodying a frame structure, central and lateral fusiform bodies below the horizontal center of the frame structure, fusiform bodies on each side of the longitudinal center of the frame structure and above the horizontal center thereof, a supporting surface above the latter named fusiform bodies formed of a series of following planes having air gaps between their proximate edges, pivotally mounted shutters controlling said gaps, means for controlling said shutters, and suitable propelling and steering means.

3. A flying machine embodying a frame structure, central and lateral fusiform bodies below the horizontal center of the frame structure, fusiform bodies on each side of the longitudinal center of the frame structure and above the horizontal center thereof, superposed supporting surfaces arranged respectively above and below the plane of the latter named fusiform bodies, each surface comprising a series of following planes, the planes of the upper surface having restricted air gaps between their proximate edges and the planes of the lower surface being arranged to provide intervening openings, shutters controlling the air gaps, means for controlling said shutters, propellers arranged to operate in the said openings, means for driving said propellers, and suitable steering means.

4. A flying machine embodying a frame structure, central and lateral fusiform bodies below the horizontal center of the frame structure, fusiform bodies on each side of the longitudinal center of the frame structure and above the horizontal center thereof, supporting surfaces, each consisting of a series of following planes, arranged respectively above and below the latter named fusiform bodies, the lower supporting surface consisting of alined lateral planes arranged in alternation with intermediate planes, propellers arranged to work within the openings formed between the planes of the lower supporting surface, means for driving said propellers, and suitable steering means.

5. A flying machine embodying a frame structure, central and lateral fusiform bodies below the horizontal center of the frame structure, fusiform bodies on each side of the longitudinal center of the frame structure and above the horizontal center thereof, supporting surfaces, each consisting of a series of following planes, arranged respectively above and below the plane of the latter named fusiform bodies, the upper planes being arranged to provide restricted air gaps and the lower planes openings of greater area than the gaps, shutters controlling the gaps, front and rear sets of doors movable vertically from the plane of the lower supporting surface to close the spaces between the same and the upper supporting surface, propellers working in the openings between the planes of the lower supporting surface, and means for controlling the shutters and doors.

6. A flying machine embodying a frame structure, a central fusiform body at the base of the frame structure, lateral fusiform bodies at the base of the frame structure mainly in rear of the transverse center of the central fusiform body, fusiform bodies arranged in lateral pairs at the top of the frame structure and on opposite sides of the longitudinal center thereof, the bodies of each pair being arranged in parallel relation mainly in advance of the transverse center of the frame and projecting to different degrees forwardly therefrom, a supporting surface at the top of the frame, and suitable propelling and steering means.

7. A flying machine embodying superposed supporting surfaces, each comprising a series of following planes, the planes of the upper series being arranged to provide restricted intermediate air gaps and the planes of the lower series arranged to provide central and lateral openings alternating in arrangement on transverse lines, shutters controlling the air gaps, front and rear central and lateral doors movable upward vertically from the plane of the lower surface to close the spaces between said surfaces at the front and rear thereof, propellers working in the openings between the planes of the lower supporting surface, means for simultaneously operating the shutters, means for simultaneously adjusting the front and rear center doors, and means for adjusting the front and rear lateral doors.

8. A flying machine embodying a frame, central and lateral fusiform bodies at the base of the frame, lateral fusiform bodies at the top of the frame, superposed supporting surfaces arranged respectively above and below the plane of the latter named fusiform bodies and each consisting of a series of following planes, the planes of the lower surface being arranged to provide intervening central and side openings, propellers arranged to operate in the central openings, propellers arranged to operate in the side openings, separate and independent motors, a drive shaft, means for driving the central propellers from the drive shaft, means for driving the side propellers from the drive shaft, and coupling means whereby the drive shaft may be interchangeably driven from either one or both motors.

In testimony whereof I affix my signature in presence of two witnesses.

CHARLES W. WALLER.

Witnesses:
  PETER A. FRANZMANN,
  A. L. FAUNCE.